United States Patent [19]
Tam

[11] Patent Number: 5,559,846
[45] Date of Patent: Sep. 24, 1996

[54] TECHNIQUE FOR IMPROVING PROCESSOR EFFICIENCY IN CT IMAGING

[75] Inventor: Kwok C. Tam, Edison, N.J.

[73] Assignee: General Electric Company, Schenectady, N.Y.

[21] Appl. No.: 532,063

[22] Filed: Sep. 22, 1995

[51] Int. Cl.⁶ ..................................................... A61B 6/03
[52] U.S. Cl. .......................... 378/4; 378/901; 364/413.16
[58] Field of Search ......................... 364/413.16, 413.19; 378/4, 15, 901

[56] References Cited

U.S. PATENT DOCUMENTS

| | | | |
|---|---|---|---|
| 5,068,882 | 11/1991 | Eberhard | 378/4 |
| 5,073,910 | 12/1991 | Eberhard et al. | 378/4 |
| 5,187,659 | 2/1993 | Eberhard et al. | 364/413.15 |
| 5,253,171 | 10/1993 | Hsiao et al. | 364/413.19 |
| 5,257,183 | 10/1993 | Tam | 364/413.19 |
| 5,270,926 | 12/1993 | Tam | 364/413.19 |
| 5,278,884 | 1/1994 | Eberhard et al. | 378/4 |
| 5,319,693 | 6/1994 | Eberhard et al. | 378/19 |
| 5,325,296 | 6/1994 | Eberhard | 364/413.15 |
| 5,333,164 | 7/1994 | Tam | 378/8 |
| 5,341,460 | 8/1994 | Tam | 395/119 |
| 5,355,309 | 10/1994 | Eberhard et al. | 364/413.15 |
| 5,500,883 | 3/1996 | Hsiao et al. | 378/4 |

Primary Examiner—David P. Porta
Assistant Examiner—David Vernon Bruce
Attorney, Agent, or Firm—Paul R. Webb, II

[57] ABSTRACT

An arrangement for CT imaging of an object is provided, wherein a cone-beam X-ray source traverses a scan path to acquire line integral data at a plurality of view positions, a set of Radon data points in Radon space being associated with the arrangement, and it being necessary to compute the Radon derivative for each Radon data point in order to construct an image of the object. The arrangement includes a specified number of processors greater than one. The Radon space is partitioned by a number of coaxial planes separated from one another by an angle of π divided by the specified number. A set of view positions likewise separated from one another by an angle equal to π divided by the specified number are selected from the plurality of view positions, and each view position in the view position set is projected into a different one of the coaxial planes to define a subset of Radon data points corresponding to one of the planes, and also to one of the processors. The processors are operated in substantially simultaneous relationship to compute the Radon derivatives for the Radon data points of their respectively corresponding subsets.

10 Claims, 5 Drawing Sheets

5,559,846

TECHNIQUE FOR IMPROVING PROCESSOR EFFICIENCY IN CT IMAGING

BACKGROUND OF THE INVENTION

The invention disclosed and claimed herein generally pertains to an improved method and apparatus for computed tomography (CT) cone-beam imaging by means of the Radon transform, which improves efficiency in processor operation. One of the most important techniques currently used in constructing a CT image of an object is based on the Radon transform, which is of particular importance in three-dimensional (3D) CT imaging. According to such technique, a cone-beam x-ray source irradiates the object while traversing a scan path, to project an image of the object onto a detector plane. Line integral, or cone beam x-ray, data is acquired at each of a succession of views, or view positions, located along the scan path. The line integral data is converted into a set of Radon data points, or planar integrals defined in Radon space, and an inverse Radon transform is performed using the planar integrals to construct the image. The conversion process is most usefully carried out by computing the radial derivative (Radon derivative) for each planar integral in the set, from which the values of respective planar integrals can be readily determined.

Commonly assigned U.S. Pat. No. 5,257,183, issued Oct. 26, 1993 to Kwok C. Tam, the inventor named herein, discloses a very effective technique for computing the Radon derivatives for use in the above process. While this technique works quite well, a great deal of computational effort is required. In the past, this has been achieved by partitioning the Radon space by means of a set of coaxial planes, such as the set of vertical or azimuthal planes shown in FIG. 4 of the above-referenced U.S. Pat. No. 5,257,183. Each of such planes is provided with a set of grid points, and each data point in a Radon data set lies in one or another of the planes, at a grid point thereof.

To determine respective derivatives, a number of adjacent partitioning planes are typically assigned to each processor in an array of processors. For a given view position, each processor computes the Radon derivatives for the Radon data points lying in its assigned planes, from line integral data acquired at the given view. Thus, the processors can be operated in parallel, that is, simultaneously and independently from one another, to reduce time and complexity in determining the derivatives.

Notwithstanding the benefits of the above arrangement, it has been found that for a given view position, the number of Radon data points lying in respective partitioning planes, for which derivatives must be computed, can vary extensively from plane to plane. Accordingly, different processors can have very different workloads, reducing efficiency of processor operation.

SUMMARY OF THE INVENTION

The invention provides an arrangement for CT imaging of an object, wherein a cone beam x-ray source traverses a scan path to acquire line integral data at a plurality of view positions, and wherein a set of Radon data points in Radon space is associated with the arrangement, it being necessary to compute the Radon derivative for each Radon data point in order to construct an image of the object. A method for computing the Radon derivatives in accordance with the invention comprises the steps of providing the arrangement with a specified number of processors, which is greater than one, and partitioning the Radon space with a number of coaxial planes which are separated from one another by an angle equal to $\pi$ divided by the number of processors. The method further includes selecting a set of view positions from the plurality of view positions, the view positions in the set likewise being separated from one another by an angle equal to $\pi$ divided by the specified number, and each view position in the set corresponding to one of the planes. Each of the view positions in the set is projected into its corresponding plane to define a subset of Radon data points for the plane, each of the subsets corresponding to a different one of the processors. The processors are then operated in substantially simultaneous relationship to compute the Radon derivatives for the Radon data points of their respectively corresponding subsets.

In a preferred embodiment, the total number of view positions is selected to be an even integral multiple of the number of processors, the scan path is circular, and the view positions are situated therearound in equidistant relationship from one another.

An object of the invention is to significantly improve efficiency in operating an array of processors to compute a set of Radon derivatives by selecting the number and location of respective view positions on the basis of the number of processors in the array.

This and other objects of the invention will become more readily apparent from the ensuing specification, taken together with the accompanying drawings.

DETAILED DESCRIPTION OF THE PREFERRED EMBODIMENT

Figure 1:
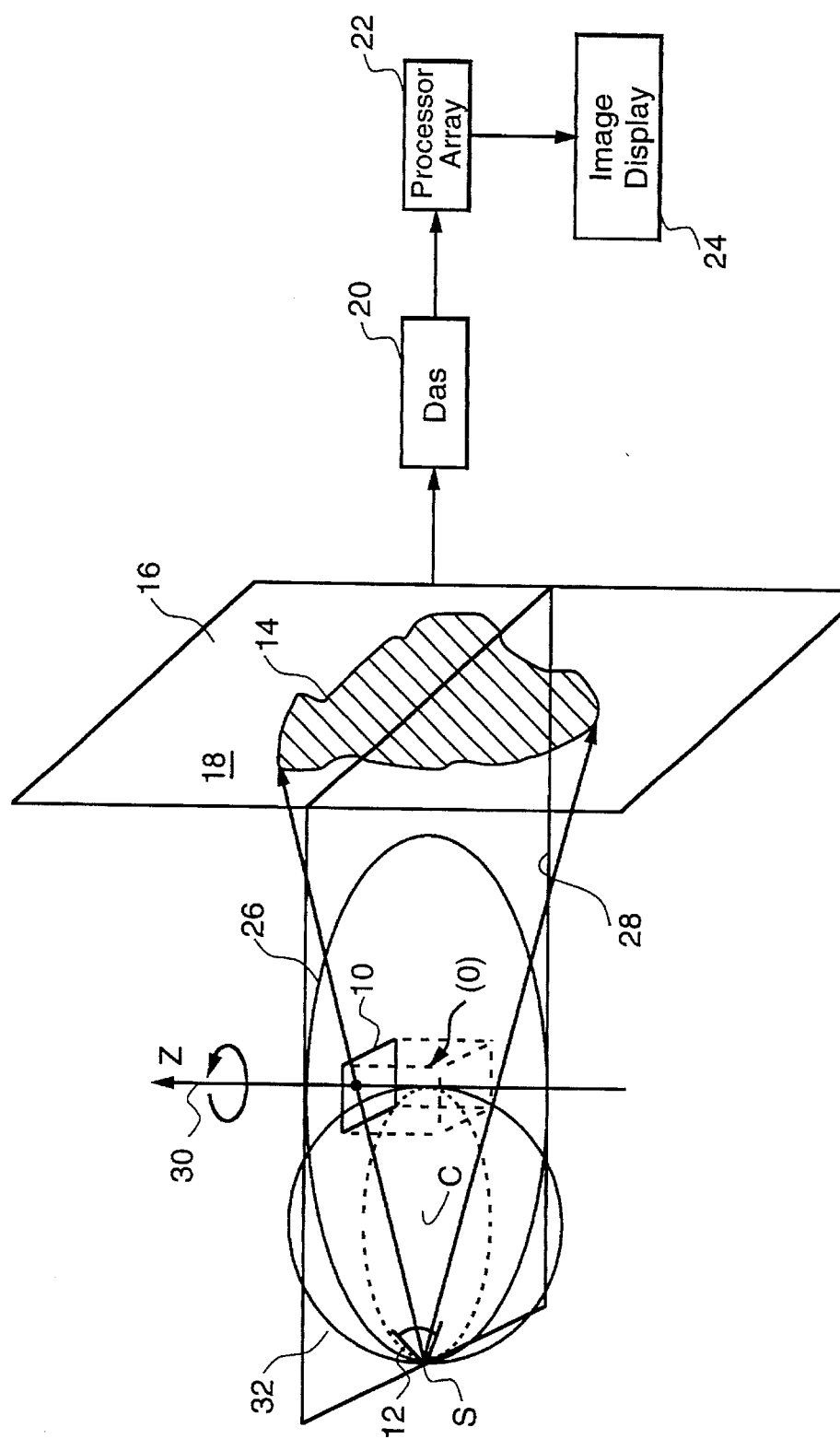
FIG. 1 is a schematic drawing illustrating the basic components of a cone-beam CT imaging system.

Referring to FIG. 1, there are shown the principal components of a cone-beam CT imaging system for constructing an image of an object 10. A cone-beam x-ray source 12 is positioned to irradiate object 10, to project data representing an image 14 thereof onto an associated detector array 16, having a planar detector surface 18. As is known in the art, detector array 16 comprises a matrix array of discrete detectors (not shown). Projected data is in the form of x-ray photons that penetrate the object and are sensed by the respective x-ray detectors of array 16. Array 16 is coupled to a Data Acquisition System (DAS) 20, which processes respective photon counts, in a manner well known in the art, to provide a set of line integral data representing the image 14.

Referring further to FIG. 1, there is shown DAS 20 coupled to a processor array 22, which receives the line integral data and operates as described herein to compute a set of Radon derivatives. Array 22 is further structured according to conventional practices to compute a set of planar integral values from the Radon derivatives, and to perform an inverse Radon transform to construct an image of the object, employing such set of planar integral values as input data therefor. The image is displayed by means of image display device 24.

FIG. 1 shows cone-beam source 12 moveable with respect to object 10 around a circular scan-path 26 to successive discrete view positions, the locations thereof being described hereinafter in connection with FIG. 6. Detector array 16 is constrained to move with source 12, and a portion of the line integral data is acquired at each successive view position.

Scan path 26 lies in a mid-plane 28 bisecting object 10. A Z-axis 30 passes through the object in orthogonal relationship with mid-plane 28, and intersects the mid-plane at a point O. The point O is usefully selected to be the origin for a coordinate system for a Radon space, containing a set of Radon data points. Each of the planar integral values, referred to above, is taken at one of the Radon data points.

FIG. 1 further shows the Radon shell 32 when the source 12 is located at a view position S in its scan trajectory 26. As is well known to those of skill in the art, the Radon shell is a spherical shell having a diameter equal to the distance between the origin O and a view position S. The center of the Radon shell 32 is located at a point C, midway therebetween. As is further well known in the art, Radon derivatives are only non-zero for Radon data points intersected by the Radon shell.

Figure 2:
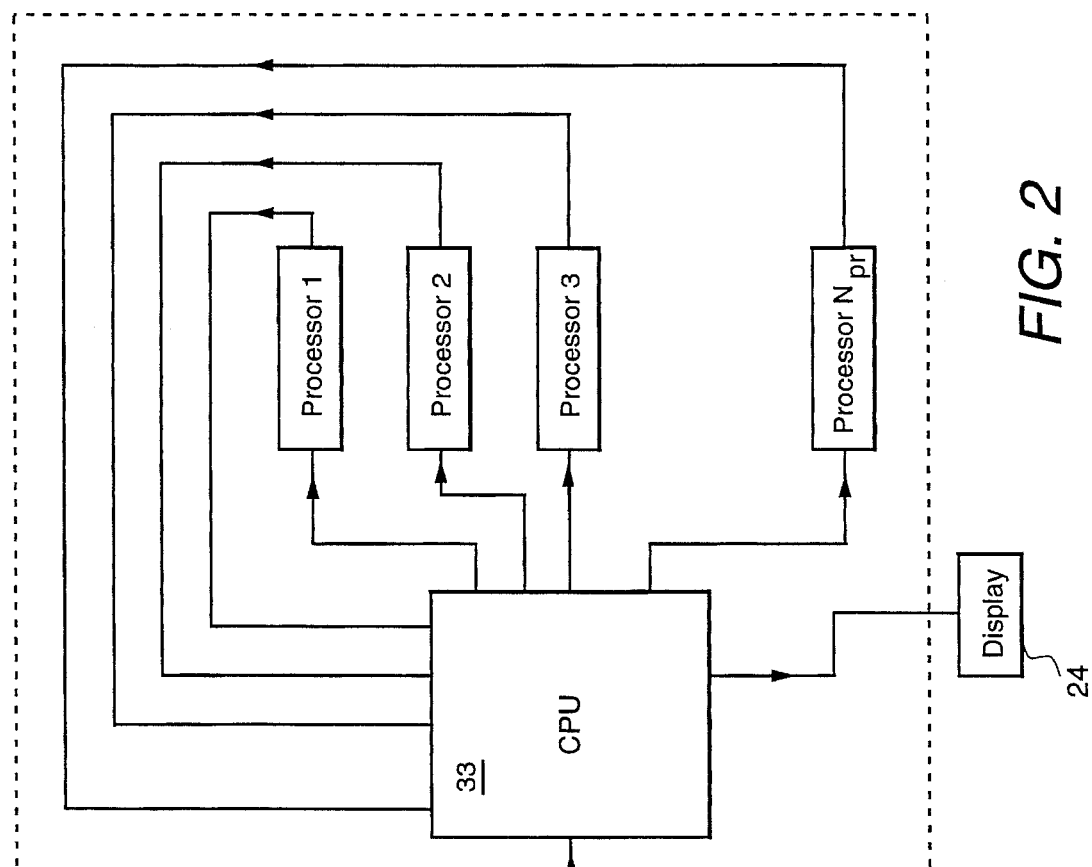
FIG. 2 is a schematic drawing showing a processor array for the system of FIG. 1 in greater detail.

Referring to FIG. 2, there is shown processor array 22 comprising a central processing unit 33, which controls the operation of processors 1-$N_{pr}$. CPU 33 couples line integral data received from DAS 20 to the respective processors and controls the operation of each processor to compute an assigned portion of the Radon derivatives required to construct an image of object 10.

Figure 3:
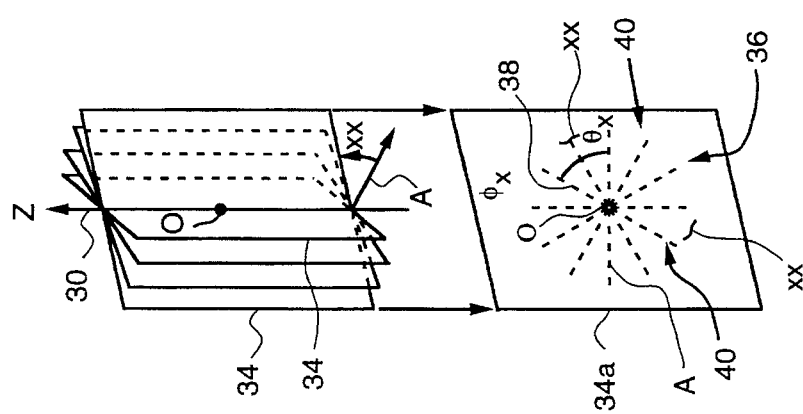
FIG. 3 depicts a set of coaxial planes for partitioning Radon space.

Referring to FIG. 3, there is shown a set of discrete vertical or azimuthal planes 34, which are co-axial about Z-axis 30 and serve to partition the Radon space. Each plane 34 lies at an angle $O_K$ with respect to an axis A, orthogonal to the Z-axis. If the number of processors in array 22 is $N_{pr}$, the total numbers of planes 34 is $MN_{pr}$, where M is an integer. The separation angle $\Delta\phi$ between planes 34 is $\pi/MN_{pr}$.

As illustrated by a plane 34a, comprising the azimuthal plane 34 at an angle $O_{K1}$, each plane 34 is provided with a circular polar grid 36 comprising discrete grid points 38, each located at a distance $r_i$ from the origin O, and lying along a grid line 40 comprising n discrete grid points 38. Each grid line 40 thus has a maximum length $r_n$ and is oriented at an angle $O_j$ from the Z axis. Each non-zero data point in the Radon data set referred to above lies on one of the grid points 38 of a plane 34, and is thereby uniquely located by the $r_i$ and $O_j$ coordinates of the grid point and the $\phi_k$ coordinate of the plane.

It will be readily apparent that each of the azimuthal planes 34 positioned about the Z-axis 30 respectively intersects the Radon shell 32. Since the Radon shell is spherical, its intersection with a plane 34 defines a circle.

Figure 4:
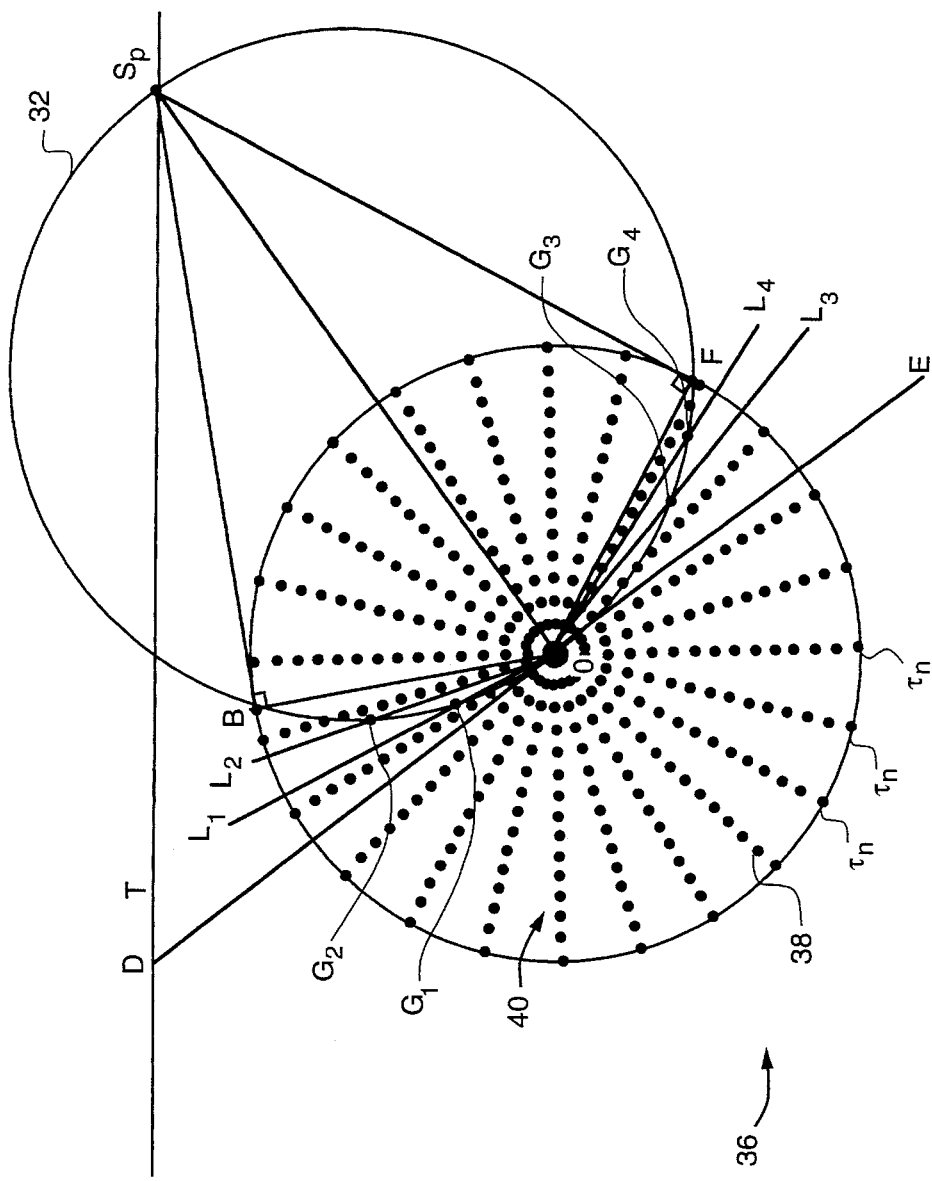
FIGS. 4 and 5 depict different planes from FIG. 3, together with the section of the Radon shell respectively lying therein.

Referring to FIG. 4, there is shown azimuthal plane $O_{K1}$ intersecting Radon shell 32, for a given view position S of source 12 in its scan path. FIG. 4 further shows a line T, comprising the projection of the scan path 26 on such plane, together with $S_p$, the projection of view position S onto the plane. The location of $S_p$ along the line T is determined by the orientation of the azimuthal plane $O_{K1}$ relative to the view position. Thus, for a given view position the location of $S_p$ varies along the length of the line T, for azimuthal planes of varying $O_k$. The plane shown in FIG. 4 has an angle $O_k$ such that the position $S_p$ lies toward an end of the line T.

Referring further to FIG. 4, there is shown the circle defined by Radon shell 32 intersecting the circle defined by the grid points 38 of radius $R_n$ at points B and F. A line DOE is drawn tangent to the Radon circle in perpendicular relationship with the line $S_pO$.

As indicated above, Radon data points will be non-zero only if they are located within the circle of radius $R_n$. Moreover, Radon derivatives will be non-zero only at positions lying along the Radon shell. Thus, for the plane shown in FIG. 4, the only grid points at which Radon derivatives need be computed are the points defined by the intersection of Radon shell 32 and the grid lines 40 respectively lying within the angles BOD and EOF. There are, of course, many more grid lines lying within each of these angles (hereinafter referred to as grid line intersection angles) than are shown in FIG. 4. For illustrative purposes, additional lines $L_1$ and $L_2$ are shown to lie within angle BOD, and lines $L_3$ and $L_4$ are shown to lie within angle EOF, respectively intersecting the circle 32 at points $G_1$–$G_4$.

Figure 5:
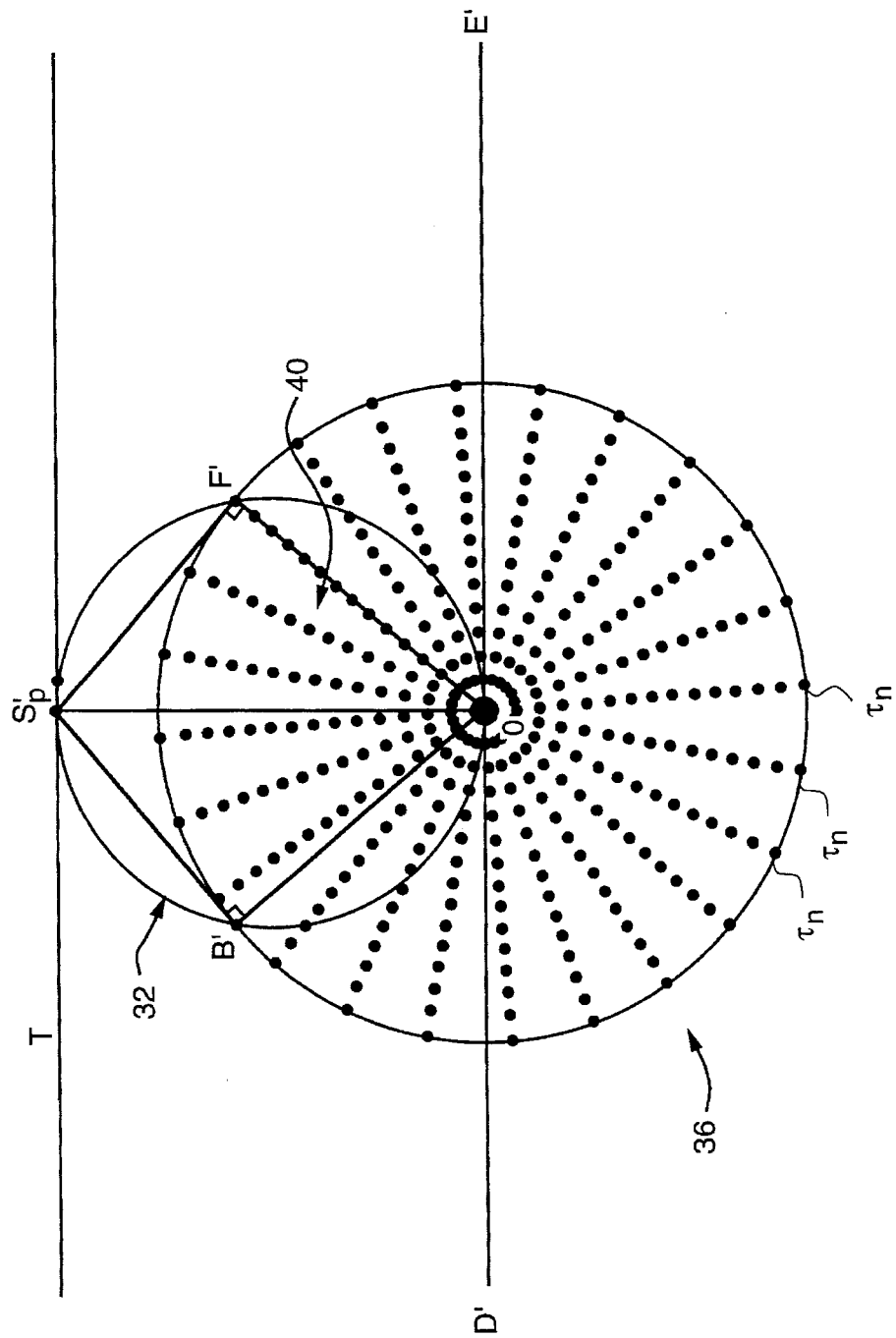

FIG. 5 shows a circle defined by the Radon shell 32 intersecting an azimuthal plane having an angle $O_k$ such that the projection of the view position S on the plane of FIG. 5 lies toward the center of the line T, at a position $S_p'$. A line D'OE' is drawn tangent to such circle, in perpendicular relationship with the line $S'_pO$. It will be seen that the angles B'OD' and E'OF', containing grid lines 40 intersected by the Radon shell, are substantially greater than the corresponding grid line intersection angles BOD and EOF, respectively, of the plane $O_{K1}$ shown in FIG. 4. Thus, it is seen that many more grid lines are intersected by the Radon shell for azimuthal planes 34 oriented such that the projection $S'_p$ of the view position S is close to the center of line T. The effort required to compute the Radon derivatives lying in such planes is correspondingly greater.

FIGS. 4 and 5 together illustrate that for a given view position, the number of Radon derivative computations required for a plane 34 is determined by the geometric relationship between the plane and the given view position, and therefore by the location of a point such as $S_p$ shown in FIG. 4, i.e., the location at which a given view position is projected into a plane along the line T thereof. It follows that if two azimuthal planes have the same geometric relationship, each with a different view position, the projections into such planes of their associated view positions will define the same number of Radon derivative computations. Derivative computation for a given view position uses line integral data acquired at the given view position as input data.

Figure 6:
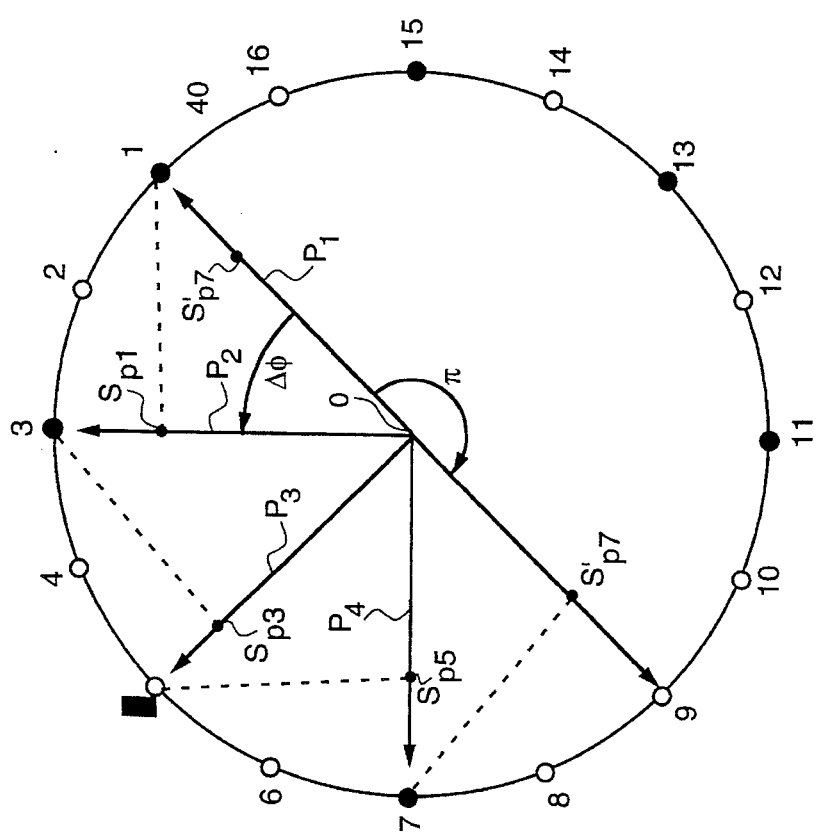

Referring to FIG. 6, there are shown view positions 1–16 positioned around scan path 26, adjacent view positions being spaced apart by a view angle $\Delta=2\pi/N_v$, where $N_v$ is the number of view positions. In accordance with the invention, $N_v$ is selected to be equal to an even integral multiple of the number of processors, i.e. $N_v=KN_{pr}$, where K is an even integer. For purposes of illustration, in connection with FIG. 6, K=4 and M=1, so that $N_{pr}=16/4=4$, and $N_a$, the number of azimuthal planes, as stated above, is $MN_{pr}=4$. Such planes are respectively represented in FIG. 6 as $P_1$–$P_4$. Other values could, of course, be selected for $N_{pr}$, $N_a$ and $N_v$, provided the above-stated relationships are maintained therebetween. From such relationships the angle $\Delta\phi$, i.e., the angular spacing between adjacent planes $P_1$–$P_4$, $\Delta\phi=K\Delta/2M\cdot\Delta\phi=2\Delta$ for the parameters of FIG. 6.

FIG. 6 further shows plane $P_1$ intersecting view position 1, and planes $P_2$, $P_3$ and $P_4$ respectively intersecting views 3, 5 and 7. Thus, $P_1$ has the same geometric relationship with view 1 as planes $P_2$, and $P_3$ and $P_4$ respectively have with view positions 3, 5 and 7. Accordingly, by assigning the derivative computations defined by each such geometric relationship to a different one of the four processors, the work loads of the processors will be the same. It is to be noted that view positions 1, 3, 5 and 7 are separated from one another by the angle $\Delta\phi$, the same angle separating adjacent planes $P_1$–$P_4$.

Referring further to FIG. 6, there are shown views 1, 3, 5 and 7 respectively projected into planes $P_2$, $P_3$, $P_4$ and $P_1$ at positions $S_{p1}$, $S_{p3}$, $S_{p5}$ and $S_{p7}$. The computational work loads defined by each of the projection positions $S_{p1}$, $S_{p3}$ and $S_{p5}$ are the same, since each such position has the same geometric relationship with its corresponding plane. With regard to $S_{p7}$, changing the orientation of a view position by $\pi$, as shown in FIG. 6, is equivalent to reflecting $S_{p7}$ about the Z-axis to its mirror image position $S'_{p7}$. The lengths of the lines $S_{p7}0$ and $S'_{p7}0$ in the plane $P_1$ are equal. Accordingly, the work load defined by projection position $S_{p7}$ is the same as each of those defined by positions $S_{p1}$, $S_{p3}$ and $S_{p5}$. It follows that the workloads of the four processors again can be made the same by assigning the derivative computations for the respective projections of the views 1, 3, 5 and 7 into planes $P_2$, $P_3$, $P_4$ and $P_1$ to different processors. The input data required for respective computations is correspondingly distributed to the processors.

Similarly, projection of view positions 1, 3, 5 and 7 respectively into planes $P_3$, $P_4$, $P_1$, and $P_2$, and into planes $P_4$, $P_1$, $P_2$ and $P_3$ (not shown) define equal processor workloads, where each processor corresponds to a different one of the vertical planes $P_1$–$P_4$, and receives the Radon derivative computations defined by view projections into its corresponding plane.

More generally, for a set of view positions separated from one another by the angle $\Delta\phi$, the projection of each view in the set into a different one of the planes $P_1$–$P_4$ defines the same number of derivative computation tasks. Each processor corresponds to a different one of the planes and is assigned the computational tasks defined by projection into its corresponding plane of one of the views from the view set. Sets of line integral data, required for the respective assigned computations, are respectively distributed to the processors. Thus, the work loads apportioned to respective processors are substantially equal.

It is to be understood that the total work effort for the arrangement shows in FIG. 6 is determined by the projection of each of the sixteen view positions 1–16 shown therein into each of the vertical planes $P_1$–$P_4$. It has been found that the line integral data required for this effort, acquired at successive view positions, is usefully distributed to the $N_{pr}$ processors in a series of cycles. In a cycle 1A, the ith processor receives the line integral data for computations defined by projection into plane $P_i$ of one of the views in the view set identified by the expressions $\{1+K/2(i-1)\}$. Thus, for K=4, processors 1–4 respectively receive data corresponding to respective projection of views 1,3,5 and 7 into the planes $P_1$–$P_4$, as described above. After the line integral data has been distributed for Radon derivatives defined by projection of the views 1,3,5 and 7 into corresponding planes $P_1$–$P_4$, the processors are simultaneously operated to compute such derivatives. Thereafter, the ith processor receives data corresponding to projection into plane $P_i$ of a different view from the view set identified by $\{1+K/2(i-1)\}$. The cycle continues until each view in the view set in turn has been projected into each plane $P_1$–$P_4$, and the corresponding computations performed by the processors.

In a cycle 1B, the ith processor receives input data corresponding to successive projection into the plane $P_i$ of each of the views from the view set identified by the expression $\{1+K/2(N_{pr}+i-1)\}$. In FIG. 6, such view set would include views 9, 11, 13 and 15.

If K is greater than 2, additional cycles 2A and 2B are required. In cycle 2A, the view set is identified by the expression $\{2+K(i-1)\}$. In cycle 2B, the view set is identified by the expression $\{2+K/2(N_{pr}+i-1)\}$.

As stated above, the number of vertical planes is $MN_{pr}$. The integer M will typically be greater than one, so that there will be many more azimuthal planes than the four planes shown in FIG. 6. In this case, the planes are partitioned among the processors so that each processor is associated with a set of M adjacent planes. However, for each of the above view sets, the work load associated with each view in a set will remain the same, provided the views are separated by the aforesaid angle of $\pi/N_{pr}$.

Figure 7:
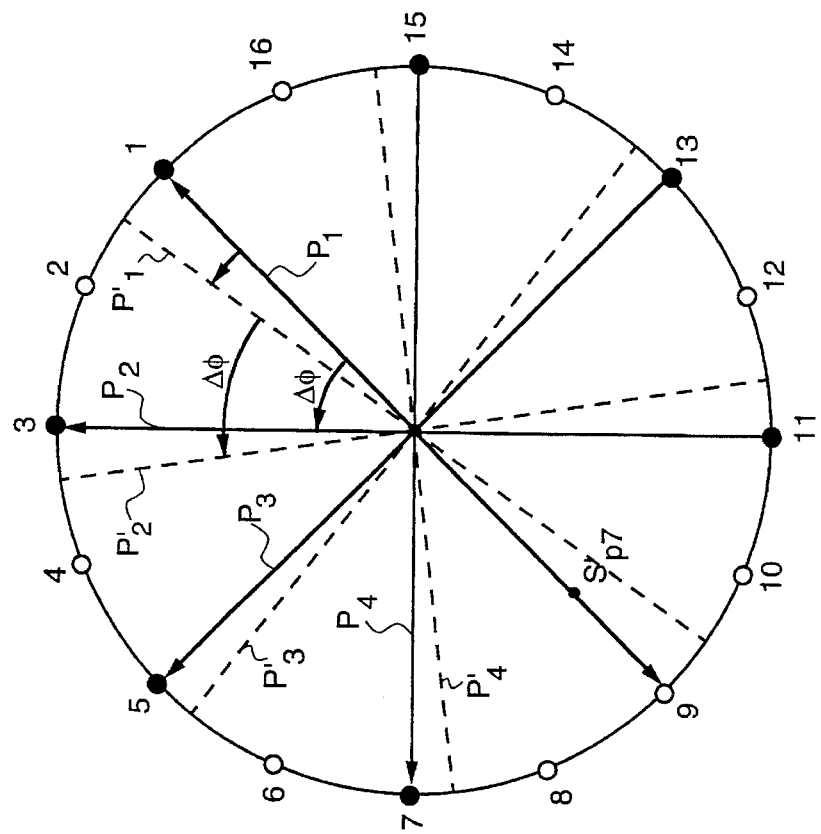
FIGS. 6 and 7 depict the scan path shown in FIG. 1 in greater detail to illustrate principals of the invention.

Referring to FIG. 7, there are shown planes $P_1$–$P_4$, each comprising the first plane in each set associated with one of the $N_{pr}$ processors. As stated above in connection with FIG. 6, these planes are spaced apart by an angle $\Delta\phi$. FIG. 7 further shows the second plane in each set, i.e., $P_1'$–$P_4'$. Each such plane is spaced apart from the respective plane $P_1$–$P_4$ by the angular spacing between planes, $\pi/MN_{pr}$. The angular spacing between the planes $P_1'$–$P_4'$ is thus also $\Delta\phi$. Accordingly, the geometric relationship between the projection of views at an angle $\Delta\phi$ from one another each into a different plane $P_1'$–$P_4'$ will be the same as for projection thereof into planes $P_1$–$P_4$, described above in connection with FIG. 6. The work loads determined thereby for the corresponding processors will likewise be the same. More generally, if the coaxial planes are grouped into sets of M planes, each set corresponding to a processor, the workload will be the same for the Kth plane in each set, where the Kth vertical planes in respective sets are spaced apart by $\Delta\phi$.

Obviously, many other modifications and variations of the present invention are possible in light of the above teaching. It is therefore to be understood that within the scope of the disclosed concept, the invention may be practiced otherwise than as specifically described.

What is claimed is:

1. In an arrangement for CT imaging of an object, wherein a cone beam X-ray source traverses a scan path to acquire line integral data at a plurality of view positions, and wherein a set of Radon data points in Radon space is associated with the arrangement, it being necessary to compute the Radon derivative for each Radon data point in order to construct an image of the object, a method for computing at least a portion of the said Radon derivatives comprising the steps of:

providing said arrangement with a specified number of processors, said specified number being greater than one;

partitioning said Radon space with a number of coaxial planes which are separated from one another by an angle equal to $\pi$ divided by said specified number;

selecting a set of view positions from said plurality, the view positions in said set likewise being separated from one another by an angle equal to $\pi$ divided by said specified number;

projecting each of said view positions in said view position set into a different one of said planes to define subsets of Radon data points respectively corresponding to said planes and to said processors; and operating said processors in substantially simultaneous relationship to compute the Radon derivatives for the Radon data points of their respectively corresponding subsets.

2. The method of claim 1 wherein:

said method includes distributing a set of said line integral data to each of said processors for respective use thereby for said Radon derivative computations.

3. The method of claim 1 wherein:

the number of view positions comprising said plurality of view positions is equal to the number of view positions in said set multiplied by a positive even integer.

4. The method of claim 3 wherein:

said coaxial planes are selected from a set of coaxial planes which collectively partition said Radon space, the total number of planes in said set of partitioning planes being equal to said specified number multiplied by an integer greater than one.

5. In an arrangement for CT imagining of an object, wherein a cone beam X-ray source traverses a scan path to acquire line integral data at a plurality of view positions, and wherein a set of Radon data points in Radon space is associated with the arrangement, it being necessary to compute the Radon derivative for each Radon data point in order to construct an image of the object, a method for computing the said Radon derivatives comprising the steps of:

providing said arrangement with a specified number of processors, said specified number being greater than one;

ordering a plurality of coaxial planes which collectively partition said Radon space into a number of plane sets, the planes in each plane set being spaced apart from one another by an angle equal to $\pi$ divided by said specified number;

ordering said view positions into a number of view position sets, the view positions in each view position set likewise being spaced apart from one another by an angle equal to $\pi$ divided by said specified number;

projecting the view positions of a given view position set into different planes of a given plane set to define respective subsets of Radon data points, each of said subsets corresponding to a different one of said processors;

distributing a set of line integral data to each of said processors;

operating said processors in substantially simultaneous relationship to compute the derivatives for their respectively corresponding data point subsets from said distributed line integral data sets, said projecting, distributing and operating steps collectively comprising a processor cycle; and executing further of said processing cycles until derivatives have been computed for the data points of all subsets defined by projecting each of said view positions respectively into each of said coaxial planes.

6. The method of claim 5 wherein:

the number of view positions comprising said plurality of view positions is equal to the number of view positions sets multiplied by a positive even integer.

7. The method of claim 6 wherein:

the number of said planes which collectively partition said Radon space is equal to said specified number multiplied by an integer greater than one.

8. Apparatus for providing an image of an object, wherein a set of Radon data points in Radon space is associated with said apparatus, it being necessary to compute the Radon derivative for each of said data points in order to construct said image, said apparatus comprising:

a cone-beam x-ray source disposed to travel along a scan path to a plurality of view positions while projecting x-ray energy toward said object, said plurality of view positions including a set of view positions separated from one another by an angle equal to $\pi$ divided by a specified number;

detector means for receiving some of said projected energy for providing a corresponding set of line integral data;

means for partitioning said Radon space with a number of coaxial planes likewise separated from one another by an angle equal to $\pi$ divided by a specified number, and for projecting each of said view positions in said set into a different one of said coaxial planes to define subsets of Radon data points respectively corresponding to said planes;

the number of processors equal to said specified number, each processor receiving a subset of said line integral data and operating in substantially simultaneously relationship with each of the other processors to compute the respective Radon derivatives for one of said Radon data points subsets.

9. The apparatus of claim 8 wherein:

the number of view positions comprising said plurality of view positions is equal to the number of view positions in said set multiplied by a positive even integer.

10. The apparatus of claim 9 wherein:

said number of coaxial planes are selected from a set of coaxial planes which collectively partition said Radon space, the total number of planes in said set of partitioning planes being equal to said specified number multiplied by an integer greater than one.

* * * * *